United States Patent [19]
Dawe

[11] Patent Number: 5,299,987
[45] Date of Patent: Apr. 5, 1994

[54] INFINITELY VARIABLE TRACTION ROLLER TRANSMISSION

[75] Inventor: Daniel J. Dawe, Austin, Tex.
[73] Assignee: Exceleramatic Inc., Austin, Tex.
[21] Appl. No.: 104,002
[22] Filed: Aug. 10, 1993

Related U.S. Application Data

[63] Continuation-in-part of Ser. No. 44,154, Apr. 8, 1993, abandoned.

[51] Int. Cl.⁵ .............................................. F16H 15/08
[52] U.S. Cl. ........................................ 476/10; 476/40; 476/46
[58] Field of Search ...................... 476/10, 40, 41, 42, 476/45, 46

[56] References Cited

U.S. PATENT DOCUMENTS

| | | | |
|---|---|---|---|
| 3,008,337 | 11/1961 | Kraus | 476/10 |
| 4,126,052 | 11/1978 | Jackman | 476/10 |
| 4,702,118 | 10/1987 | Kraus | 476/10 |

FOREIGN PATENT DOCUMENTS

| | | | |
|---|---|---|---|
| 2354193 | 7/1974 | Fed. Rep. of Germany | 476/10 |
| 1-275951 | 11/1989 | Japan | 476/46 |

Primary Examiner—Leslie A. Braun
Assistant Examiner—David W. Laub
Attorney, Agent, or Firm—Klaus J. Bach

[57] ABSTRACT

In an infinitely variable traction roller transmission wherein two toric traction discs are rotatably supported opposite one another so as to define therebetween a toric cavity in which at least two motion transmitting traction rollers are disposed in engagement with the toric discs and supported by trunnions which are pivotally supported to permit changing the ratio of motion transmission between the toric discs, each pivot trunnion has a cylindrical cavity with a support piston disposed therein in axial alignment with the traction roller supported on the trunnion and a plurality of radial lever members are arranged around the axis of the support piston and rest on a fulcrum structure disposed around the cylindrical cavity and, at their inner end, on the support piston, and a bearing disc which carries the traction roller is supported on the radial lever members at a location inwardly from the fulcrum structure to force the traction roller into engagement with the toric discs with the piston force amplified by the radial lever members.

17 Claims, 3 Drawing Sheets

INFINITELY VARIABLE TRACTION ROLLER TRANSMISSION

This application is a continuation-in-part of U.S. patent application Ser. No. 08/044,154, filed apr. 8, 1993, now abandoned.

BACKGROUND OF THE INVENTION

The invention relates to an infinitely variable traction roller transmission in which power is transmitted through traction rollers which are pivotally supported between toric input and output discs with which they are forced into firm engagement for the transmission of motion therebetween.

In such transmissions, the traction rollers are mounted on support structures which, when pivoted, cause engagement of the traction rollers with the toric discs in circles of varying diameters depending on the desired transmission ratio. The support structures are generally trunnions which are supported in a housing in such a manner that they are either axially movable or slightly tiltable for initiating a change in the transmission ratio, To provide for slight axial movability, for example, two traction roller support trunnions may be supported opposite one another by flexible tension sheets as shown in U.S. Pat. No. 4,086,820 which issued May 2, 1978 to Charles E. Kraus, To provide for slight tilting, traction roller support trunnions may be supported by a roller rolling along a partial circular track wherein one end of the trunnion is movable for tilting the trunnion in order to initiate a change in transmission ratio as disclosed in U.S. Pat. No. 4,964,312 which issued Oct. 23, 1990 to Charles E. Kraus.

For the transmission of large torques the forces with which the traction rollers have to be engaged with the toric discs are rather large. They may be provided either by forcing the toric discs toward one another or by forcing the traction roller axially into the toric cavity formed between the toric discs. This may be accomplished hydraulically by an arrangement as shown, for example, in U.S. Pat. No. 4,576,055 which issued Mar. 18, 1986 to Charles E. Kraus.

It is desirable to produce the contact forces directly under the traction roller in axial direction of the traction roller such that the required fluid traction coefficient will remain relatively constant over the selected transmission ratio range. Then a relatively large ratio range can be accommodated without overloading the contact areas in the pivotal end positions of the trunnions.

However since the required contact forces are very large and the space under a traction roller is quite limited, a large hydraulic fluid pressure is required to produce the needed contact forces. The large fluid pressures require high pressure pumps and high pressure seals which are expensive and more easily subject to failure than lower pressure components.

It is therefore the principal object of the present invention to provide an infinitely variable traction roller transmission and particularly a traction roller support arrangement which generates the large contact forces needed for the engagement of the traction rollers with the toric discs with a hydraulic operating fluid of only relatively low pressure and which is therefore reliable in operation and relatively inexpensive to manufacture.

SUMMARY OF THE INVENTION

In an infinitely variable traction roller transmission wherein two toric traction discs are rotatably supported opposite one another so as to define therebetween a toric cavity in which at least two motion transmitting traction rollers are disposed in engagement with the toric discs and supported by trunnions which are pivotally supported to permit changing the ratio of motion transmission between the toric discs, each pivot trunnion has a cylindrical cavity with a support piston disposed therein in axial alignment with the traction roller supported on the trunnion and a plurality of radial lever members are arranged around the axis of the support piston and rest on a fulcrum structure disposed around the cylindrical cavity and, at their inner end, on the support piston and a bearing disc which carries the traction roller is supported on the radial lever members at a location inwardly from the fulcrum structure to force the traction roller into engagement with the toric discs with the piston force amplified by the radial lever members.

The piston is operated by control fluid which is available for the control of the transmission ratio and generally for lubrication of the transmission and which is maintained at a relatively low system pressure. Nevertheless, with this arrangement high contact forces are obtained with relatively low control fluid system pressures so that the transmission is capable of accommodating high torques with only low pressure fluid system components.

BRIEF DESCRIPTION OF THE DRAWINGS

Each of FIG. 3

DESCRIPTION OF THE PREFERRED EMBODIMENT

Figure 1:
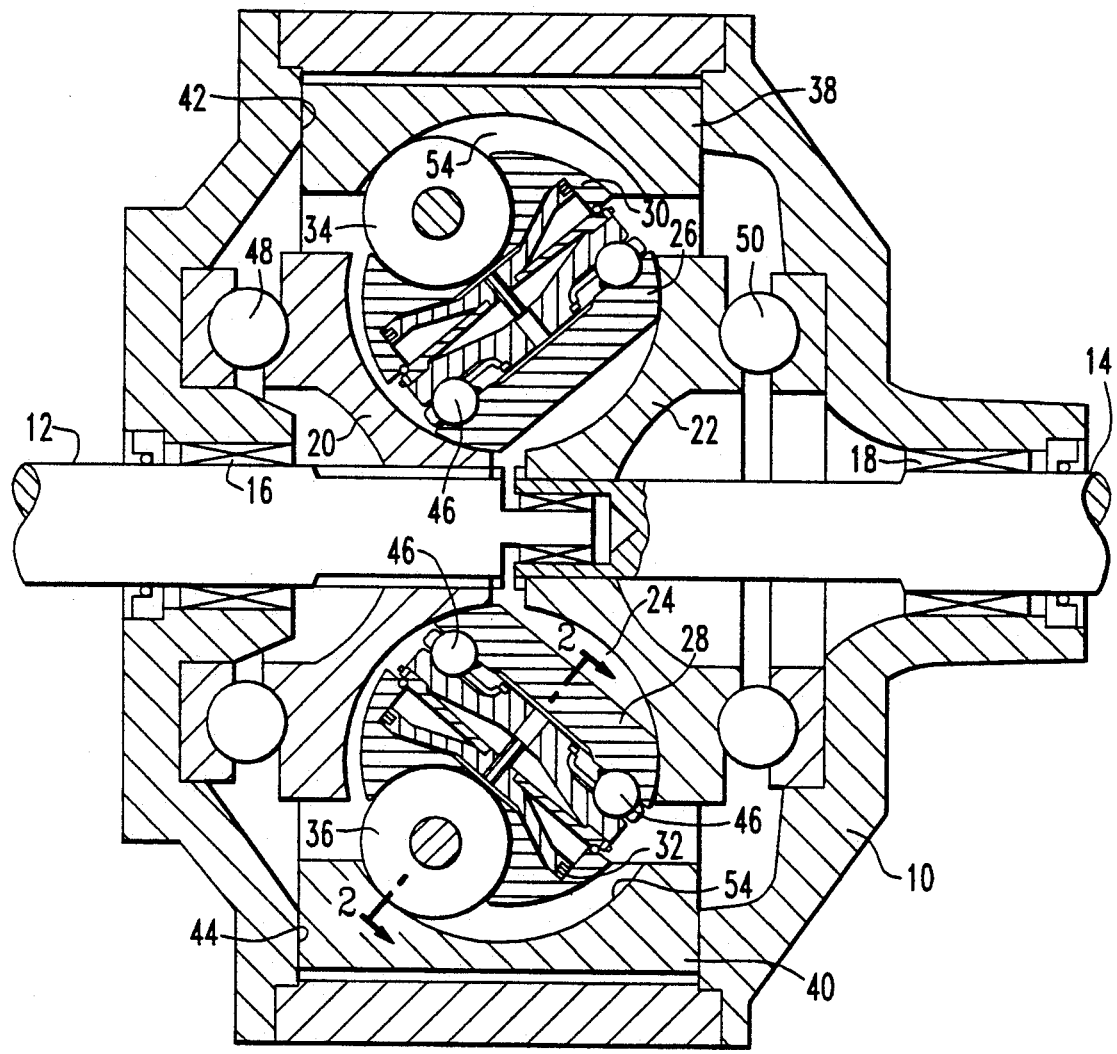
FIG. 1 is an axial cross-sectional view of the traction roller transmission.

A simple traction roller transmission as shown in FIG. 1 consists of a housing 10 having coaxial input and output shafts 12, 14 rotatably supported therein by bearings 16 and 18. Associated with the input and output shafts 12, 14 are toric discs 20, 22 which are so arranged opposite one another that a toric cavity 24 of circular cross-section is defined therebetween. Within the toric cavity 24 traction rollers 26, 28 are rotatably supported in engagement with the toric traction discs 20, 22. The traction rollers 26, 28 are supported in the housing 10 via bearings 46 on pivot trunnions 30 and 32 which are pivotally supported by way of trunnion rollers 34 and 36 running on hard metal track members 38, 40 that are provided with partial circular tracks 54 and received in track cavities 42, 44 formed in the housing 10. Each of the pivot trunnions 30, 32 carries such a traction roller bearing 46 for rotatatably supporting the associated traction rollers 26, 28 while they are forced into firm engagement with the traction discs 20 and 22 by way of the trunnion rollers 34, 36, the traction discs 20 and 22 being axially supported by axial thrust bearings 48 and 50.

Figure 2:
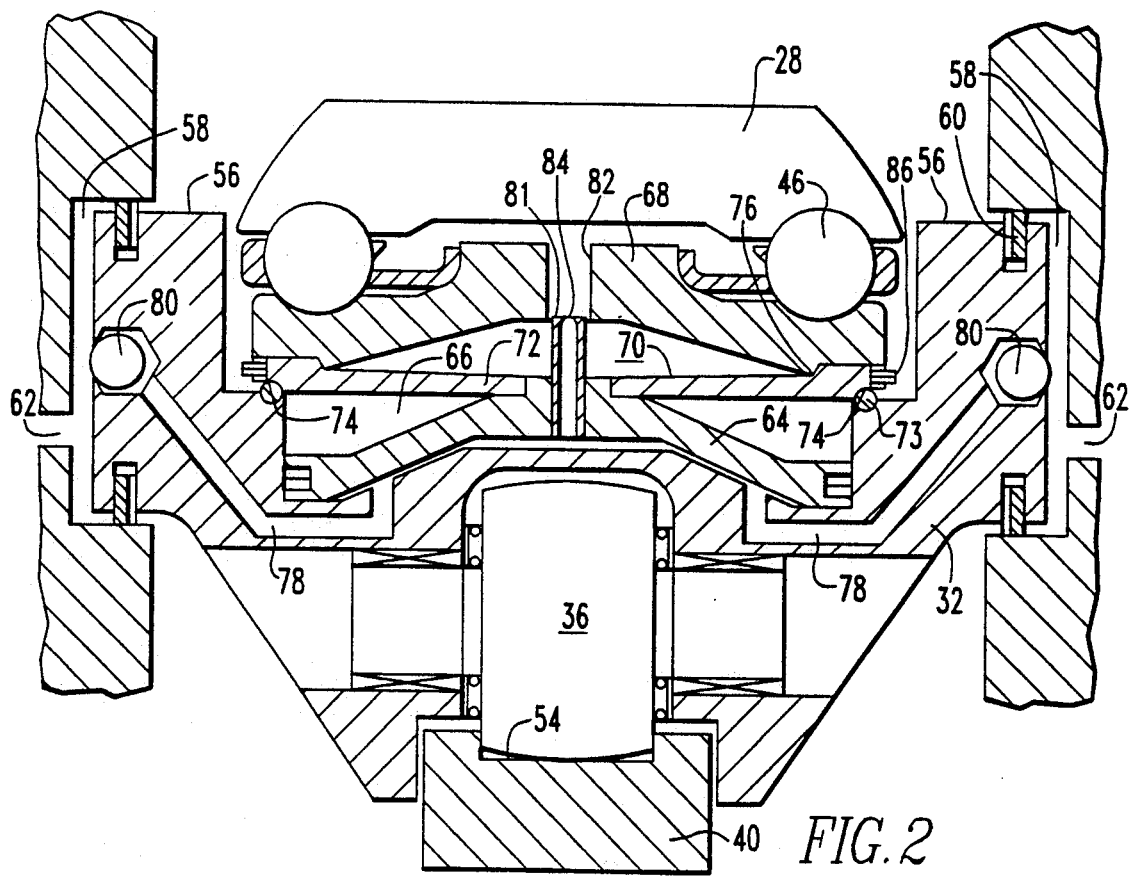
FIG. 2 is a cross-sectional view along line 2—2 of FIG. 1.

FIG. 2 shows the traction roller support arrangement in greater detail. The traction roller 28 is disposed on the trunnions 32 which has piston-like ends 56 received in cylinders in the housing 10. The piston ends 56 include piston rings 60 received in relatively wide grooves so as to be able to accommodate a relatively large play of the piston ends 56 in the cylinders 58. Pressurized fluid may be admitted to the cylinders 58 via passages 62 to cause slight axial motion with slight tilting of the trunnion 32 for initiating a transmission ratio change.

The traction roller 28 is supported on the trunnion 32 by means of a piston and lever structure which includes a roller support piston 64 which is received in a cylinder cavity 66 formed in the trunnion 32 in axial alignment with the traction roller 28. The traction roller 28 is supported, by the ball bearing 46, on a bearing disc 68 which rests near its radial outer end on a lever washer structure 70. The lever washer structure 70 comprises a plurality of radial lever members 72 which, at their outer end, rest on a fulcrum 74 and, at their inner end, on the piston 64. The support point 76 of the bearing disc 68 on t h e lever washer structure is at a predetermined distance radially inward from the fulcrum 74 of the lever members 72 so that the force of the piston 64 applied to the inner ends of the lever members 72 is multiplied when transmitted from the lever members 72 to the bearing disc 68 depending on the ratio of length of lever 72 to the distance between the fulcrum 74 and point of support 76 of the bearing disc on the lever 72. Preferably the point of support of the bearing disc 68 on the lever washer structure 70 is just below the bearing 46 to avoid bending moments on the bearing disc 68.

The piston ends 56 of the trunnion include fluid communication passages 78 with check valve structures 80 that permit fluid supplied to either of the cylinders 58 to enter the cylinder 66 for actuation of the piston 64. Movement of the piston 64 toward the traction roller applies the piston force to the bearing disc 68 via the lever washer structure 70 in an amplified manner as explained above, for forcing the traction roller 28 into engagement with the traction discs 20 and 22.

The piston 64 preferably includes a central orifice tube 81 which is slidably received in a central opening 82 in the bearing disc 68 and which includes at its free end an orifice 84 through which some of t he hydraulic fluid is released to bleed off pressurized fluid from the cylinder 66 and to provide for lubrication of the traction roller bearings 46.

Figure 3:
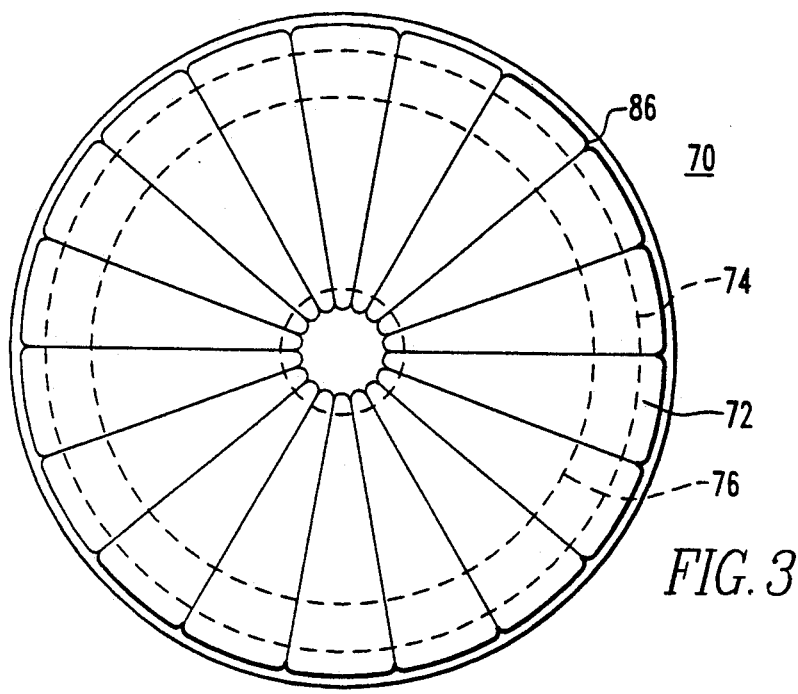

FIG. 3 is a plan view of the lever washer structure 70 which shows that the lever members 72 are disposed closely adjacent one another so as to form, together, a washer structure 70. The single lever members 72 are held together by a retaining ring 86 which is received in a circumferential groove formed in the outer ends of the lever members 72. It is noted however that although the lever members are shown closely adjacent one another they may be spaced from one another. The fulcrum 74 on which the lever members are supported may be a hard metal wire ring, for example, a "music wire" ring 73, which is set in the trunnion if the trunnion is made of aluminum. The lever members may further be designed as preload springs to provide for an initial engagement force for the traction roller with the traction disc.

The lever member support bands should be as "sharp" as possible to provide efficient lever action but they should also be able to transmit the roller axial forces without being subjected to unacceptable stress levels and to withstand the transverse reaction forces to the roller tangential force produced by the drive torque.

Figure 4:
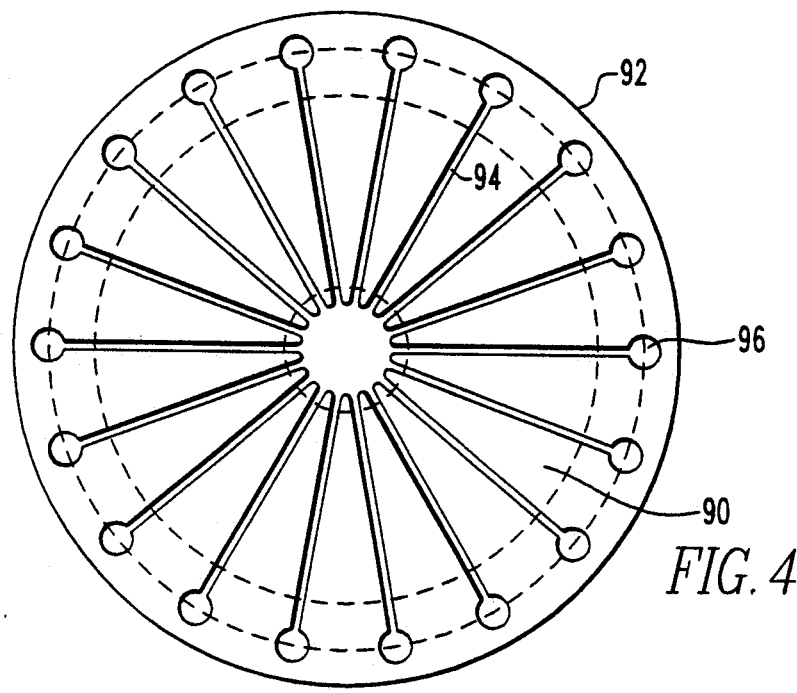
FIG. 4 is a plane view of a lever arrangement providing a lever washer structure for amplifying the fluid system pressure-derived engagement forces.

In an embodiment as shown in FIG. 4, the lever washer structure is an integral structure wherein lever members 90 are formed from a disc 92 by cutting radial slots 94. Stress relieving bores 96 are provided at the radially outer ends of the slots.

Figure 5:
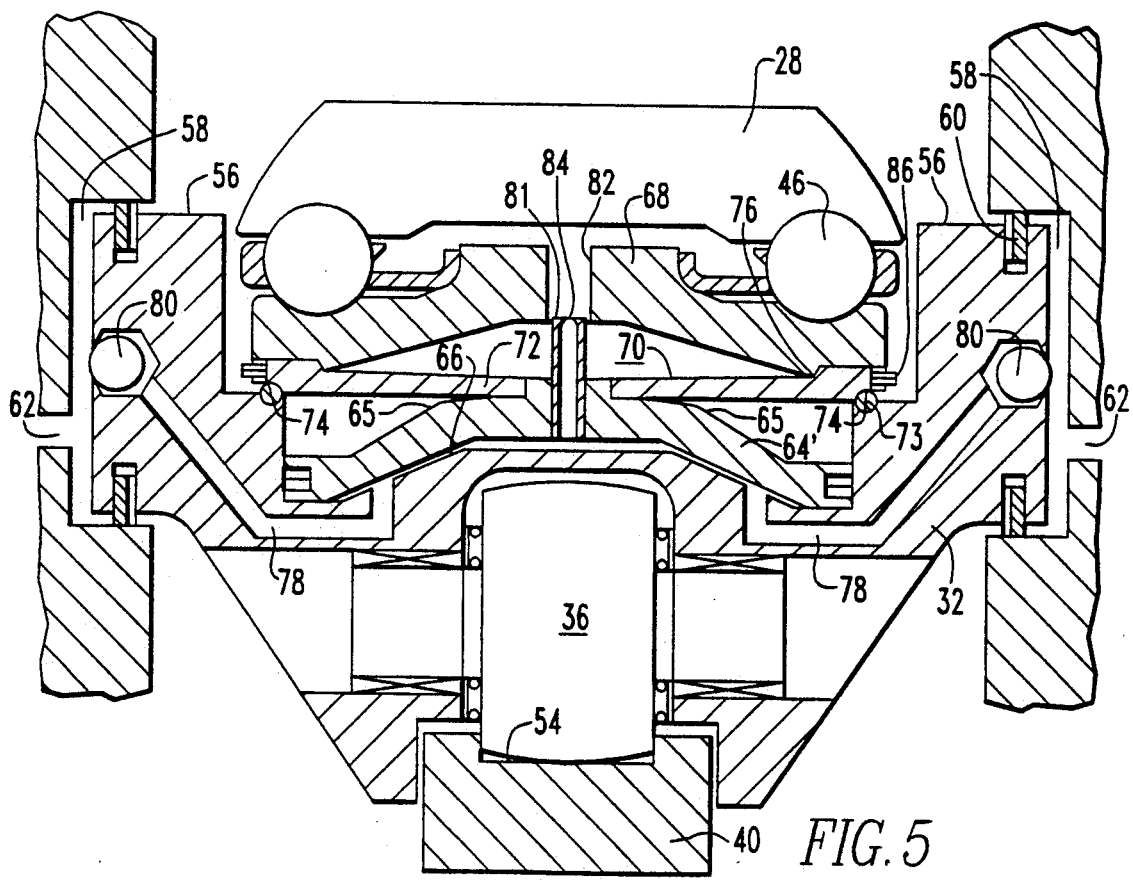
FIG. 5 shows a particular embodiment of the invention.

In this arrangement as shown in FIG. 5, the piston 64' is provided with a curved area 65 on which the inner ends of the lever members 72 rest so that as the engagement forces are increased, that is, as the piston 64' and lever members resting thereon are moved toward the traction rollers, the points of engagement of the piston 64' with the levers 72 moves outwardly thereby decreasing the lever ratio by which the engagement forces are transmitted to the traction roller bearing disc 68.

The arrangement allows to change the lever ratio as a function of load. With the arrangement according to FIG. 5 the contact pressure increase does not increase proportionally with an increase in fluid pressure. It does not need to: Since the available traction coefficient becomes larger with increased contact pressure so that the contact pressure does not need to increase at the same rate as torque load of the transmission is increased.

What is claimed is:

1. An infinitely variable traction roller transmission comprising: a transmission support structure two toric traction discs rotatably supported by said support structure, one for rotation with an input shaft and the other for rotation with an output shaft, said toric discs having opposite traction surfaces defining therebetween a toric cavity of circular cross-section, at least two motion transmitting traction rollers arranged in said toric cavity in radial symmetry and in engagement with said toric discs for the transmission of motion therebetween, each Of said traction rollers being rotatably supported by a pivot trunnion supported by said support structure for pivoting about a control axis which is essentially tangential to the center circle of said toric cavity, each pivot trunnion having a cylindrical cavity, a support Piston disposed in said cavity in axial alignment with said traction roller, a plurality of radial lever members arranged around the axis of said support piston in radial symmetry, said lever members resting at their radially outer ends on a fulcrum structure disposed around said cylindrical cavity and, at their radially inner end, on said support piston, a bearing disc rotatably supporting said traction roller and being supported on said radial lever members at a location spaced inwardly from said fulcrum structure, and means for supplying pressurized fluid to said cylinder cavity for moving said support piston toward said toric discs and said traction rollers into engagement with said toric discs with a force which is amplified by said radial lever members.

2. An infinitely variable traction roller transmission according to claim 1, wherein said radial lever members are disposed adjacent one another so as to form a lever washer structure supported near its circumference on said fulcrum structure which extends all around said cylindrical cavity.

3. An infinitely variable traction roller transmission according to claim 2, wherein a retaining ring is disposed in a groove formed in said lever washer structure so as to contain the radial lever members forming said lever washer structure.

4. An infinitely variable traction roller transmission according to claim 2, wherein said bearing disc has an annular projection defining the support point of said bearing disc on said lever washer structure.

5. An infinitely variable traction roller transmission according to claim 1, wherein said support piston includes a central orifice tube projecting axially into, and being slidably received in, an opening formed in said bearing disc, said orifice tube having an orifice at its free end in said opening for discharging fluid from said cylinder cavity at a predetermined rate.

6. An infinitely variable traction roller transmission according to claim 1, wherein, when in the end position of said support piston remote from said traction roller said radial lever members are prestressed so as to provide for an initial basic engagement force of said traction rollers with said toric discs.

7. An infinitely variable traction roller transmission according to claim 1, wherein said radial lever members are formed integrally from a washer provided with radial slots extending, in radial symmetry, from the center of said washer to near its circumference.

8. An infinitely variable traction roller transmission according to claim 7, wherein stress relieving bores are provided at the radially outer ends of said slots.

9. A pivot trunnion for supporting a traction roller of an infinitely variable traction roller transmission in which motion transmitting traction rollers are maintained in engagement with opposite toric traction discs with a variable engagement force, said pivot trunnion having a cylindrical cavity formed therein, a support piston disposed axially movably in said cavity, a plurality of radial lever members arranged around the axis of said support piston in radial symmetry, said lever members resting at their radially outer ends on a fulcrum structure disposed around said cylindrical cavity and, at their inner end, on said support piston, a bearing disc supported on said radial lever members at a location spaced inwardly from said fulcrum structure for rotatably supporting a traction roller, and passage means in said pivot trunnion for supplying pressurized fluid to said cylinder cavity for moving said support piston toward said bearing disc.

10. A pivot trunnion according to claim 9, wherein said radial 1 ever members are disposed adjacent one another so as to form a lever washer structure supported near its circumference on said fulcrum structure which extends all around said cylindrical cavity.

11. A pivot trunnion according to claim 10, wherein a retaining ring is disposed in a groove formed in said lever washer structure so as to contain the radial lever members forming said lever washer structure.

12. A pivot trunnion according to claim 10, wherein said bearing disc has an annular projection defining the support point of said bearing disc on said lever washer structure.

13. A pivot trunnion according to claim 9, wherein said support piston includes a central orifice tube projecting axially into, and being slidably received in, an opening formed in said bearing disc, said orifice tube having an orifice at its free end in said opening for discharging fluid from said cylinder cavity at a predetermined rate.

14. A pivot trunnion according to claim 9, wherein said radial lever members are formed integrally from a washer provided with radial slots extending, in radial symmetry, from the center of said washer to near its circumference.

15. A pivot trunnion according to claim 14, wherein stress relieving bores are provided at the radially outer ends of said slots.

16. An infinitely variable traction roller transmission according to claim 1, wherein said support piston has a curved surface area where the inner ends of said radial lever members rest on said piston so that their point of engagement with the piston changes outwardly as the piston moves toward the traction rollers to decrease the lever ratio of said lever members.

17. A pivot trunnion according to claim 10, wherein said support piston has a curved surface area where the inner ends of said radial lever members rest on said piston so that their point of engagement with the piston changes outwardly as the piston moves toward the traction rollers to decrease the lever ratio of said lever members.

* * * * *